(12) United States Patent
Yu et al.

(10) Patent No.: US 8,970,803 B2
(45) Date of Patent: Mar. 3, 2015

(54) SLIM BEZEL LIQUID CRYSTAL DISPLAY DEVICE

(71) Applicant: Shenzhen China Star Optoelectronics Technology Co., Ltd., Shenzhen, Guangdong (CN)

(72) Inventors: Gang Yu, Shenzhen (CN); Liuyang Yang, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 169 days.

(21) Appl. No.: 13/704,201

(22) PCT Filed: Nov. 1, 2012

(86) PCT No.: PCT/CN2012/083899
§ 371 (c)(1),
(2) Date: Dec. 13, 2012

(87) PCT Pub. No.: WO2014/059703
PCT Pub. Date: Apr. 24, 2014

(65) Prior Publication Data
US 2014/0104535 A1 Apr. 17, 2014

(30) Foreign Application Priority Data
Oct. 17, 2012 (CN) .......................... 2012 1 0395135

(51) Int. Cl.
*G02F 1/1333* (2006.01)
(52) U.S. Cl.
CPC ................ *G02F 1/133308* (2013.01)
USPC ......................................................... 349/58

(58) Field of Classification Search
CPC .............. G02F 1/133308; G02F 2001/133314; G02F 2001/13332; G02F 2001/133322; G02F 2001/133328
USPC .......................................................... 349/58
See application file for complete search history.

(56) References Cited

U.S. PATENT DOCUMENTS

2010/0177124 A1* 7/2010 Ryu et al. ....................... 345/690
2010/0309404 A1* 12/2010 Lim ................................ 349/58

FOREIGN PATENT DOCUMENTS

| CN | 102109131 A | 6/2011 |
| CN | 102155691 A | 8/2011 |
| CN | 102608788 A | 7/2012 |
| CN | 202327902 U | 7/2012 |
| JP | 2003140148 A | 5/2003 |
| KR | 20050007512 A | 1/2005 |
| KR | 20090118435 A | 11/2009 |

* cited by examiner

*Primary Examiner* — Michael Caley
(74) *Attorney, Agent, or Firm* — Andrew C. Chang

(57) ABSTRACT

The present invention provides a slim bezel liquid crystal display device, which includes a rear enclosure, a front enclosure mating the rear enclosure, and a liquid crystal display module arranged inside the rear enclosure. The rear enclosure forms a retention plate. The retention plate functions to retain a lower end of the liquid crystal display module so as to fix the liquid crystal display module in the rear enclosure. The slim bezel liquid crystal display device uses an inverted L-shaped retention plate mounted at a lower end portion of a rear enclosure to retain a liquid crystal display module in position so as to fix the liquid crystal display module in the rear enclosure. The structure is simple and assembling is easy so as to effectively achieve bezel slimming and device thinning of a liquid crystal display device.

6 Claims, 3 Drawing Sheets

SLIM BEZEL LIQUID CRYSTAL DISPLAY DEVICE

BACKGROUND OF THE INVENTION

1. Field of the Invention

The present invention relates to the field of liquid crystal displaying, and in particular to a slim bezel liquid crystal display device.

2. The Related Arts

Liquid crystal display (LCD) has numerous advantages, such as thin device body, less power consumption, and being free of radiation, and is thus widely used. Most of the liquid crystal display devices that are available in the market are backlighting liquid crystal displays, which comprise a liquid crystal display panel and a backlight module. The operation principle of the liquid crystal display panel is that liquid crystal molecules are arranged between two parallel glass substrates and electricity is selectively applied to the glass substrates to cause change of the orientation of the liquid crystal molecules in order to refract out the light from a backlight module for formation of an image.

A conventional liquid crystal display device generally comprises a rear enclosure, a front enclosure that mates the rear enclosure and a liquid crystal display module arranged in the rear enclosure. The liquid crystal display module is often fixed inside the rear enclosure by being screwed from the front side to the rear side. And then, the front enclosure is fit to the rear enclosure. Referring to FIG. 1, a schematic view is given to show an assembling structure of a conventional liquid crystal display module, which comprises an outer frame 100 forming bolt mounting zones 300. The bolt mounting zones 300 form bolt holes 500 and bolts are received through the bolt holes 500 to fix the liquid crystal display module in the rear enclosure. Due to the arrangement of the bolt mounting zones 300, the front enclosure needs a wide bezel to cover the bolt mounting zones 300. Consequently, a non-display zone of the liquid crystal display device is thus expanded. Further, since the manner of fixing is done by screwing from the front side to the rear side, the thickness of the liquid crystal display device is thus increased. With the constant progress of the manufacturing techniques of liquid crystal display device, the trend of development of liquid crystal display device is now toward bezel slimming and device thinning. The manner of fixing the liquid crystal display module to the rear enclosure affects the bezel width and overall thickness of the liquid crystal display device to quite an extent.

SUMMARY OF THE INVENTION

An object of the present invention is to provide a slim bezel liquid crystal display device, which has a simple structure, is easy to maintain, can effectively realize bezel slimming and device thinning of the liquid crystal display device, and is capable of effectively controlling maintenance cost.

To achieve the object, the present invention provides a slim bezel liquid crystal display device, which comprises a rear enclosure, a front enclosure mating the rear enclosure, and a liquid crystal display module arranged inside the rear enclosure. The rear enclosure forms a retention plate. The retention plate functions to retain a lower end of the liquid crystal display module so as to fix the liquid crystal display module in the rear enclosure.

The rear enclosure comprises a bottom board, first and second side boards respectively connected to opposite sides of the bottom board, and a third side board connected to the bottom board and also connected to the first and second side boards. The bottom board and the first, second, and third side boards delimiting an accommodation space that has an opening. The liquid crystal display module is received in the accommodation space.

The retention plate is made in the form of an inverted L-shape and is mounted to the bottom board at a location close to the third side board.

The retention plate comprises a bearing section that is perpendicularly mounted to the bottom board and a retention section that is perpendicularly connected to a free end of the bearing section. The bearing section, the retention section, and the bottom board collectively define a retention slot. The retention slot receives a lower end of the liquid crystal display module therein.

The bearing section, the bottom board, and the first, second, and third side boards are integrally formed with each other.

The bearing section, the bottom board, and the first, second, and third side boards collectively define a receiving compartment for receiving and retaining therein cables.

The front enclosure comprises a frame body and a stop plate extending from one side of the frame body. The stop plate is provided to correspond to the opening of the rear enclosure, whereby after assembling, the stop plate completely covers and shields the opening.

The frame body and the stop plate are integrally formed with each other.

The liquid crystal display module comprises a back frame, a liquid crystal display panel received in the back frame, and a backlight module.

The present invention also provides a slim bezel liquid crystal display device, which comprises a rear enclosure, a front enclosure mating the rear enclosure, and a liquid crystal display module arranged inside the rear enclosure, the rear enclosure forming a retention plate, the retention plate functioning to retain a lower end of the liquid crystal display module so as to fix the liquid crystal display module in the rear enclosure;

wherein the rear enclosure comprises a bottom board, first and second side boards respectively connected to opposite sides of the bottom board, and a third side board connected to the bottom board and also connected to the first and second side boards, the bottom board and the first, second, and third side boards delimiting an accommodation space that has an opening, the liquid crystal display module being received in the accommodation space;

wherein the retention plate is made in the form of an inverted L-shape and is mounted to the bottom board at a location close to the third side board;

wherein the retention plate comprises a bearing section that is perpendicularly mounted to the bottom board and a retention section that is perpendicularly connected to a free end of the bearing section, the bearing section, the retention section, and the bottom board collectively defining a retention slot, the retention slot receiving a lower end of the liquid crystal display module therein;

wherein the bearing section, the bottom board, and the first, second, and third side boards are integrally formed with each other;

wherein the bearing section, the bottom board, and the first, second, and third side boards collectively define a receiving compartment for receiving and retaining therein cables;

wherein the front enclosure comprises a frame body and a stop plate extending from one side of the frame body, the stop plate being provided to correspond to the opening of the rear enclosure, whereby after assembling, the stop plate completely covers and shields the opening;

wherein the frame body and the stop plate are integrally formed with each other; and wherein the liquid crystal display module comprises a back frame, a liquid crystal display panel received in the back frame, and a backlight module.

The efficacy of the present invention is that the present invention provides a slim bezel liquid crystal display device, which comprises an inverted L-shaped retention plate mounted at a lower end portion of a rear enclosure to retain a liquid crystal display module so as to fix the liquid crystal display module in the rear enclosure. The structure is simple and assembling is easy so as to effectively achieve bezel slimming and device thinning of a liquid crystal display device. Further, easy disassembling can be done with the liquid crystal display module in case of maintenance and replacement so that the maintenance cost can be effectively controlled.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
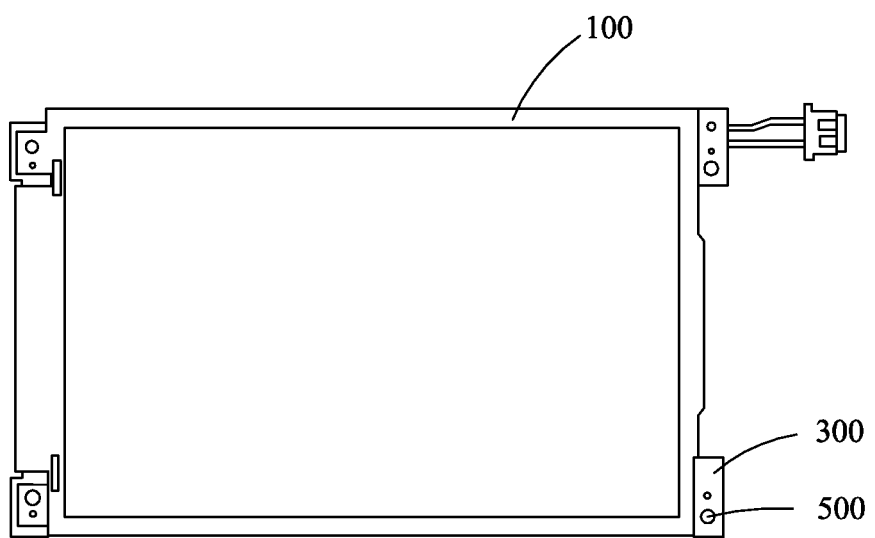
FIG. 1 is a schematic view showing an assembling structure of a conventional liquid crystal display module.
Figure 2:
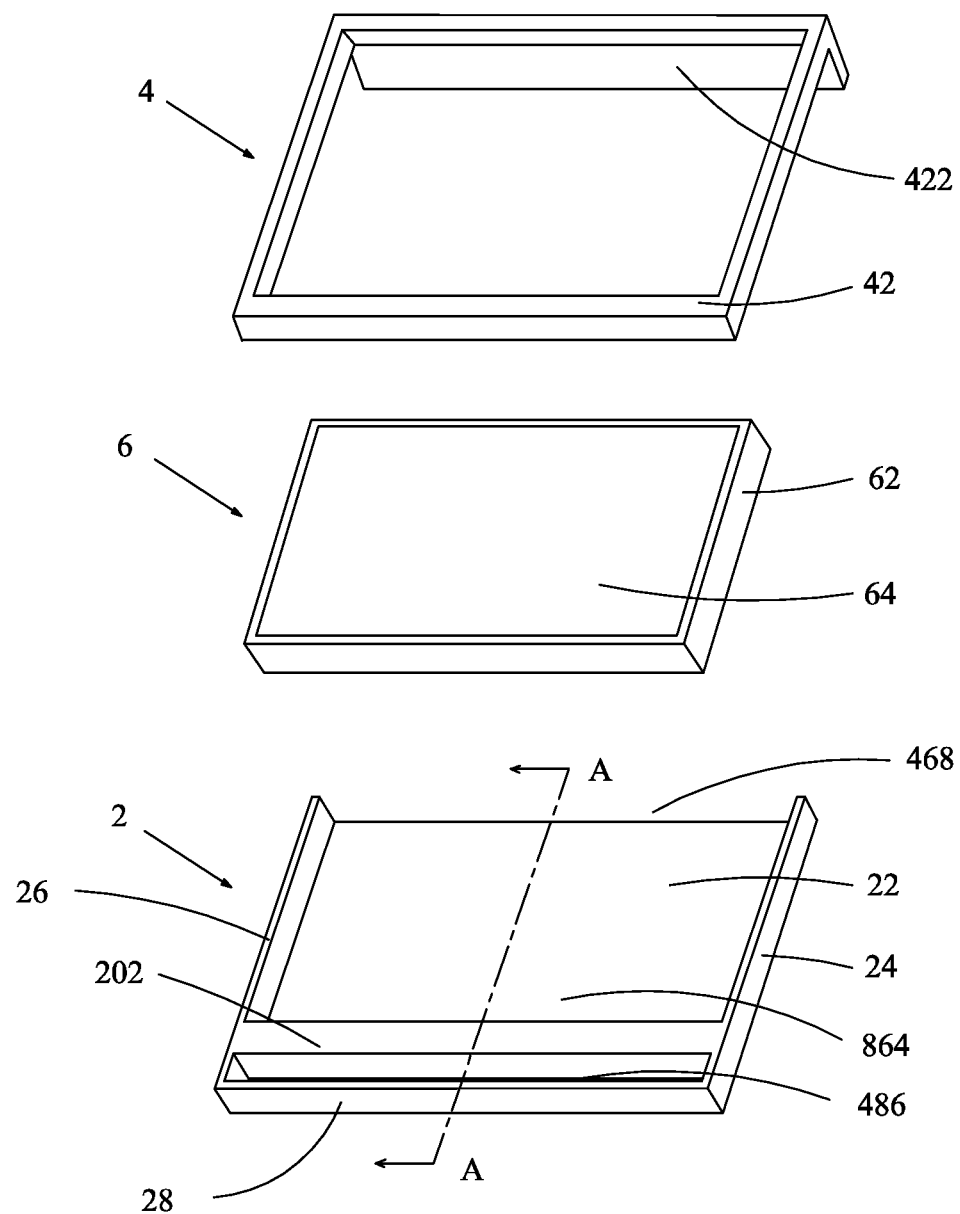
FIG. 2 is an exploded view showing a slim bezel liquid crystal display device according to a preferred embodiment of the present invention.
Figure 3:
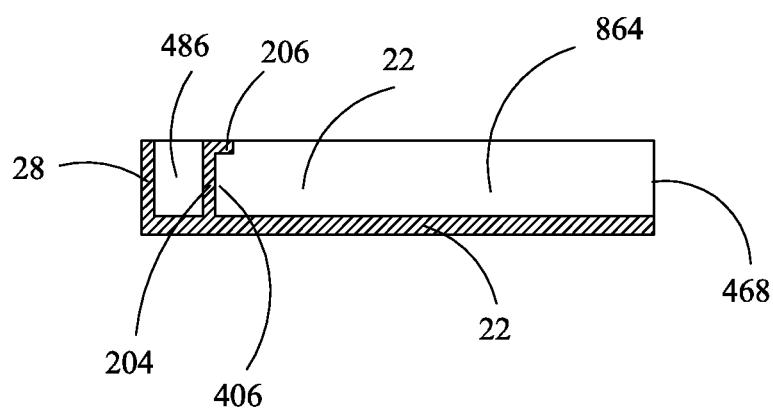
FIG. 3 is a cross-sectional view taken along line A-A of FIG. 2.

Referring to FIGS. 2 and 3, the present invention provides a slim bezel liquid crystal display device, which comprises a rear enclosure 2, a front enclosure 4 mating the rear enclosure 2, and a liquid crystal display module 6 arranged inside the rear enclosure 2. The rear enclosure 2 forms a retention plate 202 and the retention plate 202 functions to retain the liquid crystal display module 6 in position so as to fix the liquid crystal display module 6 in the rear enclosure 2. The structure is simple and assembling is easy so as to effectively achieve bezel slimming and device thinning of the liquid crystal display device. Further, easy disassembling can be done with the liquid crystal display module in case of maintenance and replacement so that the maintenance cost can be effectively controlled.

The rear enclosure 2 comprises a bottom board 22, first and second side boards 24, 26 respectively connected to opposite sides of the bottom board 22, and a third side board 28 connected to the bottom board 22 and also connected to the first and second side boards 24, 26. The bottom board 22 and the first, second, and third side boards 24, 26, 28 delimit an accommodation space 864 that has an opening 468. The liquid crystal display module 6 is received in the accommodation space 864.

The retention plate 202 is made in the form of an inverted L-shape and is mounted to the bottom board 22 at a location close to the third side board 28. The retention plate 202 comprises a bearing section 204 that is perpendicularly mounted to the bottom board 22 and a retention section 206 that is perpendicularly connected to a free end of the bearing section 204. The bearing section 204, the retention section 206 and the bottom board 22 collectively define a retention slot 406. The retention slot 406 is provided to receive a lower end of the liquid crystal display module 6 therein.

The bearing section 204, the bottom board 22, and the first, second, and third side boards 24, 26, 28 collectively define a receiving compartment 486 for receiving and retaining therein cables. Preferably, the bearing section 204, the bottom board 22, and the first, second, and third side boards 24, 26, 28 are integrally formed with each other.

The front enclosure 4 comprises a frame body 42 and a stop plate 422 extending from one side of the frame body 42. The stop plate 422 is provided to correspond to the opening 468 of the rear enclosure 2. After assembling, the stop plate 422 may completely cover and shield the opening 468 to prevent invasion of for example dusts. Preferably, the frame body 42 and the stop plate 422 are integrally formed with each other.

To assemble, the liquid crystal display module 6 is inserted through the opening 468 of the rear enclosure 2 into the accommodation space 864 until the lower end of the liquid crystal display module 6 is completely received in the retention slot 406. Then, the front enclosure 4 is set to mate the rear enclosure 2 and under this condition, the stop plate 422 completely shields the opening 864 so as to retain the liquid crystal display module 6 between the front enclosure 4 and the rear enclosure 2.

The liquid crystal display module 6 comprises a back frame 62, a liquid crystal display panel 62 received in the back frame 62, and a backlight module (not shown). The backlight module provides a uniformly distributed planar light source to the liquid crystal display panel 64 to ensure normal operation of the liquid crystal display module 6.

In summary, the present invention provides a slim bezel liquid crystal display device, which comprises an inverted L-shaped retention plate mounted at a lower end portion of a rear enclosure to retain a liquid crystal display module so as to fix the liquid crystal display module in the rear enclosure. The structure is simple and assembling is easy so as to effectively achieve bezel slimming and device thinning of a liquid crystal display device. Further, easy disassembling can be done with the liquid crystal display module in case of maintenance and replacement so that the maintenance cost can be effectively controlled.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A slim bezel liquid crystal display device, comprising a rear enclosure, a front enclosure mating the rear enclosure, and a liquid crystal display module arranged inside the rear enclosure, the rear enclosure forming a retention plate, the retention plate functioning to retain a lower end of the liquid crystal display module so as to fix the liquid crystal display module in the rear enclosure;

wherein the rear enclosure comprises a bottom board, first and second side boards respectively connected to opposite sides of the bottom board, and a third side board connected to the bottom board and also connected to the first and second side boards, the bottom board and the first, second, and third side boards delimiting an accommodation space that has an opening, the liquid crystal display module being received in the accommodation space;

wherein the retention plate is made in the form of an inverted L-shape that comprises a bearing section that is perpendicularly mounted to the bottom board at a location close to the third side board and a retention section that is perpendicularly connected to a free end of the bearing section, the bearing section, the retention section, and the bottom board collectively defining a retention slot having an open side facing away from the third side board to receive entry of a lower end of the liquid crystal display module so as to fix the lower end of the liquid crystal display module in the retention slot; and wherein the bearing section of the L-shaped retention plate, the bottom board, and the first, second, and third side boards collectively define a receiving compartment for receiving and retaining therein cables.

2. The slim bezel liquid crystal display device as claimed in claim 1, wherein the bearing section, the bottom board, and the first, second, and third side boards are integrally formed with each other.

3. The slim bezel liquid crystal display device as claimed in claim 1, wherein the front enclosure comprises a frame body and a stop plate extending from one side of the frame body, the stop plate being provided to correspond to the opening of the rear enclosure, whereby after assembling, the stop plate completely covers and shields the opening.

4. The slim bezel liquid crystal display device as claimed in claim 3, wherein the frame body and the stop plate are integrally formed with each other.

5. The slim bezel liquid crystal display device as claimed in claim 1, wherein the liquid crystal display module comprises a back frame, a liquid crystal display panel received in the back frame, and a backlight module.

6. A slim bezel liquid crystal display device, comprising a rear enclosure, a front enclosure mating the rear enclosure, and a liquid crystal display module arranged inside the rear enclosure, the rear enclosure forming a retention plate, the retention plate functioning to retain a lower end of the liquid crystal display module so as to fix the liquid crystal display module in the rear enclosure;

wherein the rear enclosure comprises a bottom board, first and second side boards respectively connected to opposite sides of the bottom board, and a third side board connected to the bottom board and also connected to the first and second side boards, the bottom board and the first, second, and third side boards delimiting an accommodation space that has an opening, the liquid crystal display module being received in the accommodation space;

wherein the retention plate is made in the form of an inverted L-shape that comprises a bearing section that is perpendicularly mounted to the bottom board at a location close to the third side board and a retention section that is perpendicularly connected to a free end of the bearing section, the bearing section, the retention section, and the bottom board collectively defining a retention slot having an open side facing away from the third side board to receive entry of a lower end of the liquid crystal display module so as to fix the lower end of the liquid crystal display module in the retention slot;

wherein the bearing section, the bottom board, and the first, second, and third side boards are integrally formed with each other;

wherein the bearing section of the L-shaped retention plate, the bottom board, and the first, second, and third side boards collectively define a receiving compartment for receiving and retaining therein cables;

wherein the front enclosure comprises a frame body and a stop plate extending from one side of the frame body, the stop plate being provided to correspond to the opening of the rear enclosure, whereby after assembling, the stop plate completely covers and shields the opening;

wherein the frame body and the stop plate are integrally formed with each other; and wherein the liquid crystal display module comprises a back frame, a liquid crystal display panel received in the back frame, and a backlight module.

\* \* \* \* \*